(12) United States Patent  
Yao et al.

(10) Patent No.: US 10,411,492 B2  
(45) Date of Patent: Sep. 10, 2019

(54) WIRELESS POWER TRANSMITTER SHIELD WITH CAPACITORS

(71) Applicant: Intel Corporation, Santa Clara, CA (US)

(72) Inventors: Zhen Yao, San Jose, CA (US); Songnan Yang, San Jose, CA (US); Suraj Sindia, Hillsboro, OR (US); Essam Elkhouly, Santa Clara, CA (US); Ntsanderh C. Azenui, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 14/757,636

(22) Filed: Dec. 23, 2015

(65) Prior Publication Data

US 2017/0187209 A1 Jun. 29, 2017

(51) Int. Cl.
*H02J 7/02* (2016.01)
*H02J 50/12* (2016.01)
*H02J 50/40* (2016.01)

(52) U.S. Cl.
CPC .............. *H02J 7/025* (2013.01); *H02J 50/12* (2016.02); *H02J 50/40* (2016.02)

(58) Field of Classification Search
CPC ............. H02J 7/025; H02J 5/005; H02J 17/00
See application file for complete search history.

(56) References Cited

U.S. PATENT DOCUMENTS

| 5,453,686 | A | 9/1995 | Anderson |
| 7,825,543 | B2 | 11/2010 | Karalis et al. |
| 8,076,801 | B2 | 12/2011 | Karalis et al. |
| 8,704,513 | B2 | 4/2014 | Lepage |
| 8,754,609 | B2 | 6/2014 | Tsai et al. |
| 8,855,554 | B2 | 10/2014 | Cook et al. |
| 9,166,413 | B2 | 10/2015 | Hashiguchi |
| 9,312,729 | B2 | 4/2016 | Yasuda et al. |

(Continued)

FOREIGN PATENT DOCUMENTS

| CN | 1362770 A | 8/2002 |
| CN | 103339698 A | 10/2013 |

(Continued)

OTHER PUBLICATIONS

International Search Report for related PCT Application PCT/US2016/057386 filed Oct. 17, 2016 dated Jan. 20, 2017, 3 pages.

(Continued)

*Primary Examiner* — David V Henze-Gongola
(74) *Attorney, Agent, or Firm* — International IP Law Group, P.L.L.C.

(57) ABSTRACT

Techniques for focusing the energy radiated by a wireless power transmitting unit are described. An example power transmitting unit includes a transmitter coil configured to generate a magnetic field to wirelessly power a device within an active wireless charging area. The power transmitting unit also includes a power generating circuitry to deliver current to the transmitter coil to generate the magnetic field. The power transmitting unit also includes a shield disposed around the transmitter coil to reduce the strength of the magnetic field outside of the active wireless charging area.

21 Claims, 5 Drawing Sheets

(56) References Cited

U.S. PATENT DOCUMENTS

| | | | |
|---|---|---|---|
| 9,502,922 | B2 | 11/2016 | Hasegawa et al. |
| 9,548,621 | B2 | 1/2017 | Asanuma et al. |
| 9,590,445 | B2 | 3/2017 | Aerts et al. |
| 9,601,933 | B2 | 3/2017 | Graham |
| 9,620,964 | B2 | 4/2017 | Terao |
| 9,793,045 | B2 | 10/2017 | Abe et al. |
| 10,012,725 | B2 | 7/2018 | Sieber et al. |
| 10,090,713 | B2 | 10/2018 | Gaskill et al. |
| 2002/0079863 | A1 | 6/2002 | Shigeo et al. |
| 2004/0222792 | A1 | 11/2004 | St. Pierre et al. |
| 2004/0268278 | A1 | 12/2004 | Hoberman et al. |
| 2005/0148858 | A1 | 7/2005 | Hargreaves |
| 2007/0007821 | A1 | 1/2007 | Rossetti |
| 2009/0224608 | A1 | 9/2009 | Cook et al. |
| 2010/0172168 | A1* | 7/2010 | Fells .................. H02J 7/025 363/164 |
| 2011/0239013 | A1 | 9/2011 | Muller |
| 2012/0080957 | A1 | 4/2012 | Cooper et al. |
| 2012/0229140 | A1 | 9/2012 | Shimokawa |
| 2013/0049482 | A1 | 2/2013 | Rofe et al. |
| 2013/0049484 | A1 | 2/2013 | Weissentern et al. |
| 2013/0093252 | A1 | 4/2013 | Norconk et al. |
| 2013/0147283 | A1 | 6/2013 | Kawano et al. |
| 2013/0289383 | A1 | 10/2013 | Flynn et al. |
| 2014/0315024 | A1 | 10/2014 | Muramatsu et al. |
| 2015/0022020 | A1 | 1/2015 | Borngraber |
| 2015/0091518 | A1 | 4/2015 | Komma et al. |
| 2015/0145339 | A1 | 5/2015 | Chiyo et al. |
| 2015/0197155 | A1 | 7/2015 | Lu et al. |
| 2015/0364938 | A1 | 12/2015 | Lapetina et al. |
| 2016/0049698 | A1 | 2/2016 | Kawano et al. |
| 2016/0121732 | A1 | 5/2016 | Matsumoto et al. |
| 2016/0181875 | A1 | 6/2016 | Long et al. |
| 2016/0241038 | A1 | 8/2016 | Netreba et al. |
| 2016/0243949 | A1 | 8/2016 | Merkel et al. |
| 2016/0261142 | A1 | 9/2016 | Park et al. |
| 2016/0276948 | A1 | 9/2016 | Adamczyk et al. |
| 2016/0329748 | A1* | 11/2016 | White, II ................ H01F 38/14 |
| 2017/0012475 | A1 | 1/2017 | Zhang et al. |
| 2017/0035402 | A1 | 2/2017 | Matsui et al. |
| 2017/0104371 | A1 | 4/2017 | Wakabayashi et al. |
| 2017/0106759 | A1 | 4/2017 | Yamakawa et al. |
| 2017/0155286 | A1 | 6/2017 | Kato |
| 2017/0155288 | A1 | 6/2017 | Lee et al. |
| 2017/0170688 | A1 | 6/2017 | Maniktala |
| 2017/0179731 | A1 | 6/2017 | Sindia et al. |
| 2017/0187209 | A1 | 6/2017 | Yao et al. |
| 2017/0222493 | A1 | 8/2017 | Oki et al. |
| 2017/0310232 | A1 | 10/2017 | De Hoog et al. |

FOREIGN PATENT DOCUMENTS

| | | |
|---|---|---|
| CN | 104682573 B | 6/2015 |
| CN | 107534321 A | 1/2018 |
| WO | 2015060781 A1 | 4/2015 |
| WO | 2017112054 A1 | 6/2017 |

OTHER PUBLICATIONS

Chinese Search Report for related Patent Application CN20160254094 dated Mar. 2, 2018.

* cited by examiner

500

WIRELESS POWER TRANSMITTER SHIELD WITH CAPACITORS

TECHNICAL FIELD

This disclosure relates generally to techniques for wireless charging. Specifically, this disclosure relates to techniques for containing the electromagnetic field generated by a wireless charging transmitter.

BACKGROUND

A basic wireless charging system may include a wireless power transmitter unit (PTU) and a wireless power receiving unit (PRU). A PRU may be implemented in a mobile computing device, such as a laptop, tablet or smart phone, which can be placed on a charging mat equipped with a PTU. The PTU may include a transmit (Tx) coil and a PRU may include a receive (Rx) coil. The transmit coil and receive coil may be referred to as induction coils. In typical induction chargers, the transmit coil creates an alternating electromagnetic field and the receive coil takes power from the electromagnetic field and converts it back into electrical current to charge the battery and/or power the device. The two induction coils in proximity combine to form an electrical transformer. In some circumstances, the electromagnetic field generated by the transmit coil may interfere with surrounding electronics, even if the electronics are outside the area intended for wireless charging.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

The subject matter disclosed herein relates to techniques for containing the electromagnetic field generated by a transmit coil of a wireless charging device. As mentioned above, the electromagnetic field generated by the transmit coil may tend interfere with surrounding electronics in some cases. For example, the electromagnetic field may tend to create noise in audio systems, touch screens, and others devices outside the active charging area. Additionally, if two or more transmit coils are installed close to each other, mutual coupling between the coils may induce excessive current in neighboring resonant transmit coils, resulting in energy loss.

The techniques described herein provide a shielded transmit coil structure. The transmit coil includes one or more primary conductor turns for charging. External to the transmit coil is an additional conductor turn that acts as a shield to cancel at least part of the field outside the transmit coil. The shield can be passive or active. In an active shield, the shielding turn is conductively coupled to the coil and couples some of the electrical energy from the transmit coil. In a passive shield, the shielding turn is conductively isolated from the transmit coil. A method on optimizing this shielding turn to achieve maximum field shielding is also described.

The techniques discussed herein may be implemented in part using a wireless charging standard protocol, such as a specification provided by Alliance For Wireless Power (A4WP), Wireless Power Consortium (WPC), and others. However, the techniques described herein may be implemented using any other wireless charging standard protocol where applicable.

Figure 1:
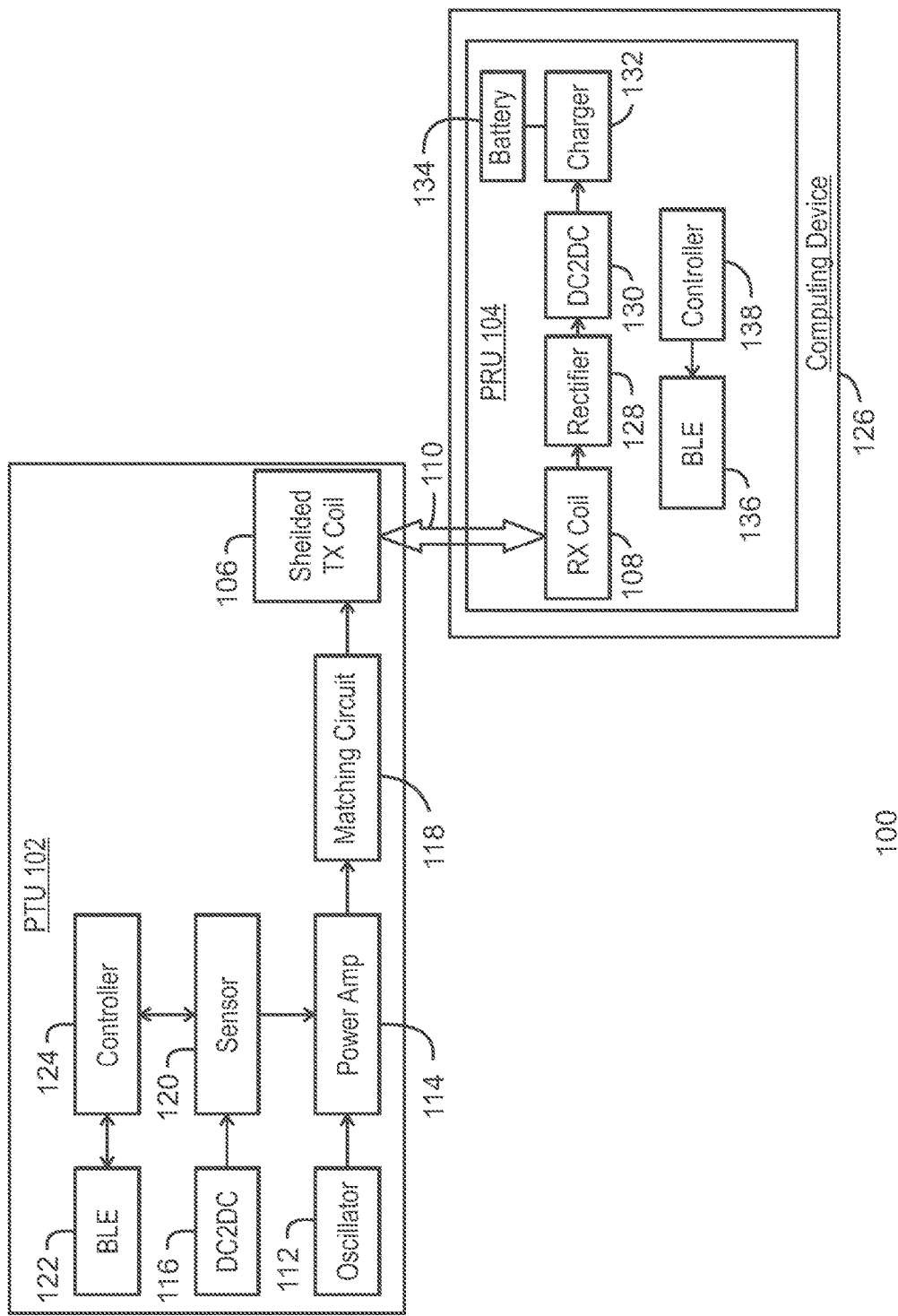
FIG. 1 is block diagram of a PTU to provide power to a PRU.

FIG. 1 is block diagram of a PTU to provide power to a PRU. A PTU 102 may be coupled to a PRU 104 via magnetic inductive coupling between two resonators referred to herein as the transmit (Tx) coil 106 and the receive (Rx) coil 108, as indicated by the arrow 110. As discussed further below, the transmit coil is shielded to more effectively focus the magnetic energy transmitted by the transmit coil 106.

The PTU 102 may include an oscillator 112, a power amplifier 114, a Direct Current to Direct Current (DC2DC) converter 116, and a matching circuit 118. The oscillator 112 is configured to generate a periodic oscillating electronic signal at a specified frequency. The power amplifier 114 receives direct current power from the DC2DC converter 116, and amplifies the signal received from the oscillator 112. The matching circuit 118 matches the impedance of the power amplifier 114 to the impedance of the transmit coil 106 to ensure efficient power transmission. The matching circuit 118 may include any suitable arrangement of electrical components such as capacitors, inductors, and other circuit elements that can be adjusted to impedance match the transmit coil 106 to the power amplifier 114.

Other components of the PTU may include a current sensor 120, a Bluetooth Low Energy (BLE) module 122, a controller 124, and others. The current sensor 120 may be an ampere meter, a volt meter, or any other sensor configured to sense load variations occurring due to inductive coupling between the PTU 102 and another object, such as the PRU 104. The current sensor 120 may provide an indication of load change to the controller 124 of the PTU 102. The controller 124 can be configured to control various aspects of the operation of the PTU 102. For example, the controller 124 can set a frequency, and/or power level of the power radiated by the transmit coil 106. The controller 124 can also control communications between the PTU 102 and the PRU 104 through the BLE module 122.

The PRU 104 may be a component of a computing device 126 configured to receive power from the PTU 102 wirelessly by the inductive coupling 110. The computing device 126 may be any suitable type of computing device, including a laptop computer, an Ultrabook, a tablet computer, a phablet, a mobile phone, smart phone, smart watch, and other types of mobile battery-powered devices.

The PRU 104 can include a rectifier 128, a DC2DC converter 130, a battery charger 132, and a battery 134. The computing device 126 receives electrical power as a magnetic flux associated with the inductive coupling that passes through the receive coil 108. The rectifier 128 receives an alternating current (AC) voltage from the receive coil 108 and generates a rectified DC voltage (Vrect). The DC2DC converter 130 receives the rectified voltage from the rectifier 128, converts the voltage to a suitable voltage level, and provides the output to the battery charger 132. The battery 134 powers the various platform hardware of the computing device 126. The platform hardware includes the processors, working memory, data storage devices, communication buses, I/O interfaces, communication devices, display devices, and other components that make up the computing device 126.

The PRU 104 may also include a Bluetooth Low Energy (BLE) module 136 and a controller 138. The controller 138 is configured to perform a wireless handshake with the PTU 102. As discussed above, the wireless handshake broadcast may be performed through the BLE modules 122 and 136 or other wireless data transmission component. Various types of information may be transmitted during the wireless handshake, including power budget, wireless charging capabilities, size of the computing device 126, and other information.

In some examples, the PTU 102 may be implemented in a planned infrastructure, such as an airport or hotel conference room for example. Furthermore, there may be several such PTUs 102 deployed close to one another. For example, a large conference table may have several embedded PTUs 102 deployed at center-to-center distances of 30 to 60 centimeters (cm) from one another. Each PTU 102 may have a tendency to interfere with surrounding electronics that are outside of the active charging area. For the PTUs 102 may interfere with touch screens or create audio noise in public address audio systems or audio bridges. Furthermore, if multiple PTUs 102 are installed close to one other, coupling between adjacent TX coils may be prominent, which means the oscillating magnetic field leakage from a working TX coil may induce excessive current in neighboring resonant TX coils, resulting in energy loss.

As indicated in FIG. 1, the transmit coil 106 is shielded to reduce the magnetic energy that is radiated outside of the active charging area. By reducing the magnetic energy that is radiated outside of the active charging area, the interference with other electronics and the energy loss due to coupling between adjacent TX coils can both be reduced. The shielded transmit coil 106 includes primary turns for charging and a shielding turn to strategically cancel the field outside the charging coil. In some examples, the shielding turn is conductively coupled to the primary turns and actively driven by the PTU circuitry. In some examples, the shielding turn is conductively isolated from the primary turns and is excited parasitically by the magnetic field generated by the primary turns. Some examples of shielded transmit coils 106 are described further below in relation to FIGS. 2 and 3.

The block diagram of FIG. 1 is not intended to indicate that the PTU 102 and/or the PRU 104 are to include all of the components shown in FIG. 1. Further, the PTU 102 and/or the PRU 104 may include any number of additional components not shown in FIG. 1, depending on the details of the specific implementation.

Figure 2:
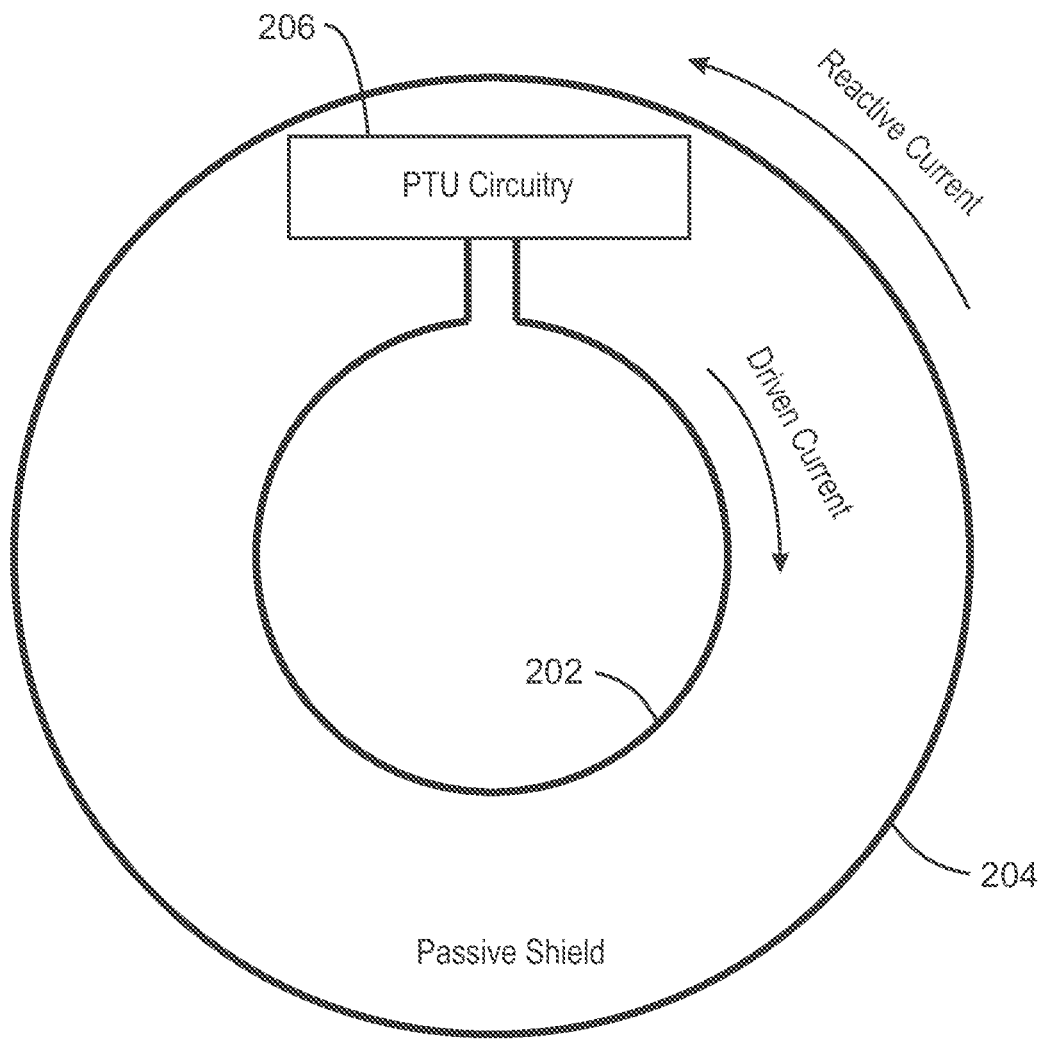
FIG. 2 is an illustration of one example of a shielded transmit coil.

FIG. 2 is an illustration of one example of a shielded transmit coil. The shielded transmit coil 106 includes a primary turn 202. The primary turn is a conductive ring coupled to the PTU circuitry 206. The PTU circuitry 206 generates the current to be driven on the primary turn 202 for wireless charging. The PTU circuitry 206 may include the components described in relation to FIG. 1, such as the oscillator 112, the power amplifier 114, the DC2DC converter 116, the matching circuit 118, and others.

In relation to the transmit coil 106, there is a defined area referred to herein as the active charging area. The active charging area is where PRUs 104 are supposed to be placed so that the PTU 102 will be activated and begin generating an oscillating magnetic field to charge the PRU 104. Typically, the magnetic field is maintained at a relatively uniform and strong level within the active charging area. Outside the charging area, the magnetic field weakens with distance. In some examples, the active charging area will be approximately equal to the area bounded by the primary turn 202 (or outer primary turn 202 if there is more than one).

The shielded transmit coil 106 also includes a shielding turn 204, which surrounds the active charging area and reduces the level of magnetic energy radiated outside of the active charging area. In the example shown in FIG. 2, the shielding turn 204 is passive, meaning that the shielding turn 204 is not actively driven by the PTU circuitry 206 or any other conductively coupled current source. The shielding turn 204 couples a portion of the magnetic energy radiated by the primary turn 202, resulting in a reactive current on the shielding turn. The shielding turn 202 and the primary turn 202 are in approximately the same plane.

As shown in FIG. 2, a current flowing counterclockwise in the driven primary coil will cause an induced current in the shielding turn that flows in the clockwise direction. In accordance with Lenz's law, the induced current in the shielding turn is such as to negate the changing flux across its surface. The induced current generates a magnetic field that counters the magnetic field of the driven coil in the region outside of the shielding turn 204. Thus, the inclusion of the shielding turn 204 has the net effect of accelerating the decay of the magnetic field in the region outside of the shielding turn 204. In some cases, the magnetic field outside of the shielding turn 204 may decay at an increased rate on the order of $1/r^6$.

The shielding turn 204 may also have the effect of slightly reducing the strength of the magnetic field in the active charging area. The gap between the primary turn 202 and the shielding turn 204 may be selected so that the net flux across the inner closed surface of the shielding turn 204 will be kept small, due to the presence of both strong positive and strong negative flux in that region. This can help to ensure that the perturbation caused by the shielding turn 204 of the fields in the active charging area is kept small.

A suitable gap between the primary turn 202 and the shielding turn 204 may be determined experimentally or through computer simulation. In some examples, the gap may be approximately 0.7 to 0.8 times the radius of the primary turn (or the outer-most turn of the primary turns if there is more than one).

It will be appreciated that the shielded transmit coil 106 shown in FIG. 2 is a simplified representation of one example of a shielded transmit coil 106. For example, the primary turn 202 and the shielding turn 204 may be shapes other than circular, such as elliptical, rectangular, and others. Furthermore, the primary turn 202 may include several turns spaced at various distances from one another rather than the single turn shown in FIG. 2. Furthermore, it will also be appreciated that the simplified illustration shown in FIG. 2 is not drawn to scale.

Figure 3:
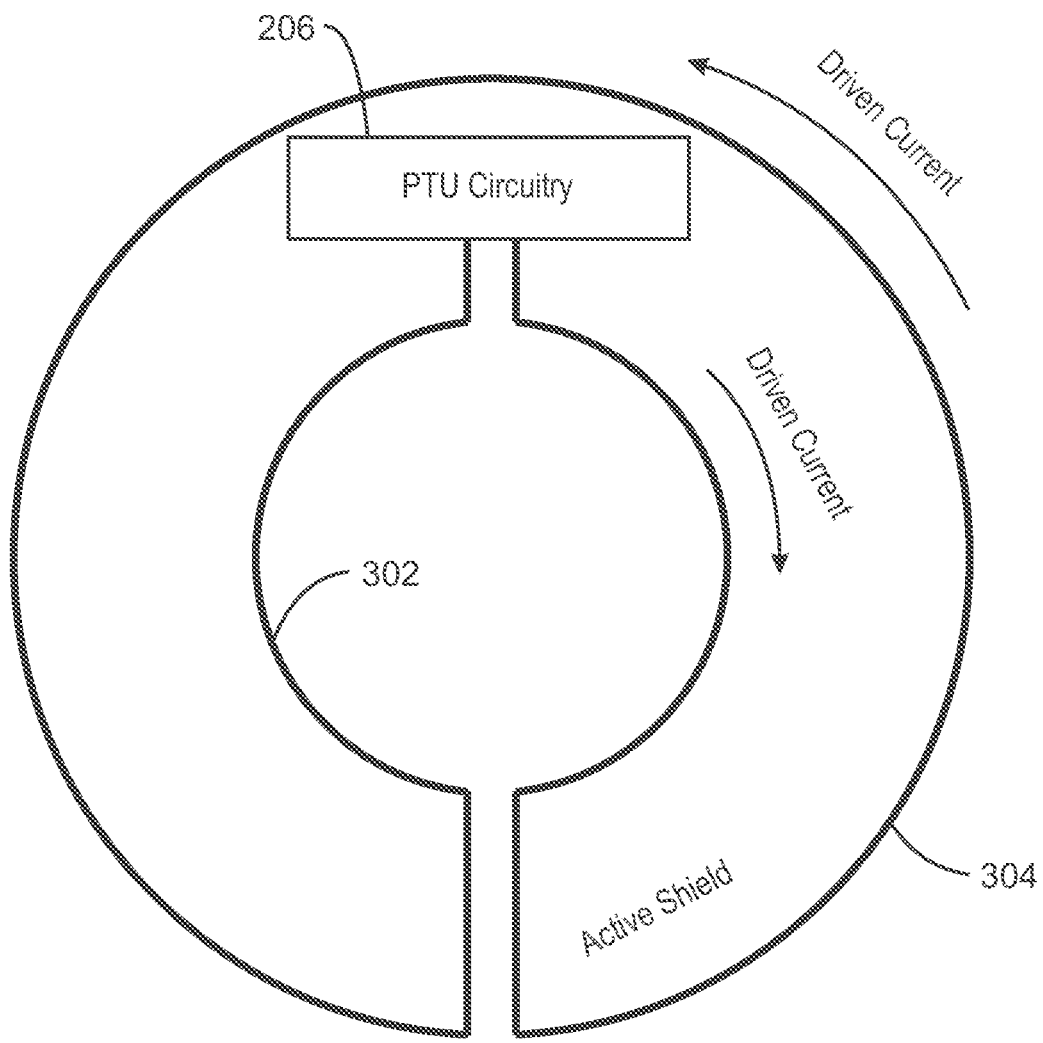
FIG. 3 is an illustration of another example of a shielded transmit coil.

FIG. 3 is an illustration of another example of a shielded transmit coil. As in FIG. 1, the shielded transmit coil 106 includes a primary turn 202, which is coupled to the PTU circuitry 206 and generates the magnetic field for wireless charging. The example of FIG. 3 also includes a shielding turn 204, which surrounds the active charging area and reduces the level of magnetic energy radiated outside of the active charging area. However, in the example shown in FIG. 3, the shielding turn 204 is active, meaning that the shielding turn 204 is conductively coupled to and driven by the PTU circuitry 206. Thus, the shielding turn 204 conductively couples a portion of the current being driven by the PTU circuitry 206.

The current in shielding turn 304 is driven directly by the PTU circuitry 206 in an opposite direction compared to the current in the primary turn 302. Thus, if the current is in the clockwise direction in the primary turn 302, the current in the shielding turn flows in anti-clockwise direction and vice versa. In this way, the magnetic field generated by the shielding turn cancels the magnetic field produced by the primary turns. In the active charging area, the magnetic field generated by the shielding turn is small compared to the magnetic field provided by the primary turn. However, outside of the active charging area, the magnetic field generated by the shielding turn is strong enough to at least partially cancel the magnetic field generated by the primary turns. Thus, the active shielding turn preserves the useful magnetic field in the active charging area but tends to cancel the detrimental magnetic field outside of the active charging area.

The gap between the primary turn 302 and the shielding turn 304 may be selected to increase the degree of field cancellation outside of the active charging area and reduce the effect on the magnetic field inside the active charging area. A suitable gap between the primary turn 202 and the shielding turn 204 may be determined experimentally or through computer simulation. In some examples, the gap may be approximately 0.7 to 0.8 times the radius of the primary turn (or the outer-most turn of the primary turns if there is more than one).

It will be appreciated that the shielded transmit coil 106 shown in FIG. 3 is a simplified representation of one example of a shielded transmit coil 106. For example, the primary turn 302 and the shielding turn 304 may be shapes other than circular. Furthermore, the primary turn 302 may include several turns spaced at various distances from one another rather than the single turn shown in FIG. 3. Furthermore, it will also be appreciated that the simplified illustration shown in FIG. 3 is not drawn to scale.

Figure 4:
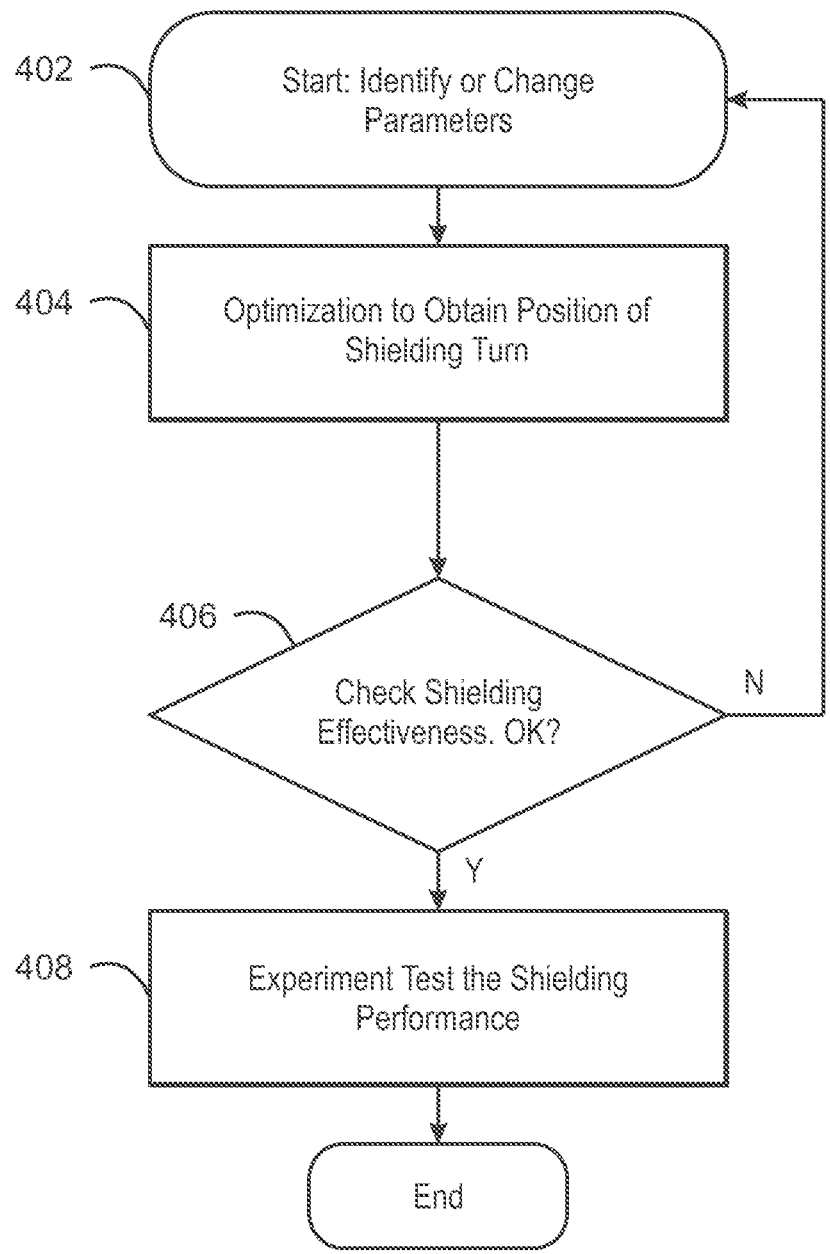
FIG. 4 is a process flow diagram of a method of manufacturing a shielded transmit coil.

FIG. 4 is a process flow diagram of a method of manufacturing a shielded transmit coil. The method 400 is an iterative process by which suitable dimensions can be obtained for shielding turn compared to the primary turns or turns. For the method 400 it is assumed that the dimensions of the primary turns has been established. The method may begin at block 402.

At block 402, a set of design parameters is determined. The set of design parameters may include a dimension range and step size for the active shielding turn. The dimension range is a range of shielding turn radiuses over which the shielding turn will be tested. The set of design parameters may also include a target radius at which to achieve to highest level of field cancellation. The set of design parameters may also include an identification of whether the shield will be active or passive, which will affect the characteristics of the current on the shielding turn.

At block 404, the set of design parameters may be input to an optimization program that estimates the fields at various points. In some examples, the optimization program may be configured to minimize the cost function shown below:

$$F = \sum_i |H_z^{primary}(r_i) + H_z^{shielding}(r_i, r_s)|$$

In the above equation, $r_i$ stands for some sampling point positions in the region need field suppression and $r_s$ stands for the radius of the shielding turn. The cost function could also be formulated as shown below:

$$F = \sum_i |H_z^{primary}(r_i) + H_z^{shielding}(r_i, r_s)| + w * \sum_j |H_z^{shielding}(r_j, r_s)|$$

In the above equation, $r_j$ stand for some sampling points positions in the central changing area, and w is a weighting factor that provides tradeoff between field cancellation in the outer region and field preservation in active charging area. The weighting factor, w, can also be one of the parameters identified at block 402. The cost function, F, will be computed for the shielding turn positions identified in block 402. The shielding turn positions that minimizes the cost function, F, will be selected as the estimated shielding turn position for further analysis. After the shielding position is estimated, the process flow advances to block 406.

At block 406, the shielding effectiveness is evaluated. The criteria for determining the shielding effectiveness can include the level of field suppression outside of the active charging area, as well as the level of disturbance to the magnetic field inside the active charging area. For example, the level of field suppression at various distances outside of the active charging area may be compared to a threshold suppression level. If the shielding effectiveness is inadequate, the process flow may return to block 402, wherein new parameters will be selected for the cost function minimization process. If the shielding effectiveness is determined to be adequate, the process flow may advance to block 408.

At block 408, the shielded transmit coil can be tested to determine a measured shielding effectiveness. If the shielding turn is determined to be effective, the method 400 ends. Testing the shielded transmit coil can include building a physical test setup according to the shielding turn position identified at block 404, and performing a number of fields measurements at a range of distances from the shielded transmit coil. Adding a shielding turn to a transmit coil may change the input impedance of the PTU due to the mutual inductance between the primary turns and the shielding turn. So the process of testing the shielded transmit coil may include retuning the transmit coil to enable the amplifier to effectively drive current into the transmit coil.

In some cases, depending on the circumference of the shielding turn relative to the wavelength, the current may be non-uniform along the shielding turn due to the wavelength effect. If the optimization of the shielding turn is based on an assumption of current uniformity assumption for fast calculation, the calculation accuracy may be compromised by the wavelength effect. To mitigate the wavelength effect, capacitors can be adding to the coil to effectively separate the coil into multiple segments, with each segment resonating by itself. Reducing the wavelength effect enables the current to flow more uniformly along the shielding turn.

The method 400 should not be interpreted as meaning that the blocks are necessarily performed in the order shown. Furthermore, fewer or greater actions can be included in the method 400 depending on the design considerations of a particular implementation.

Figure 5:
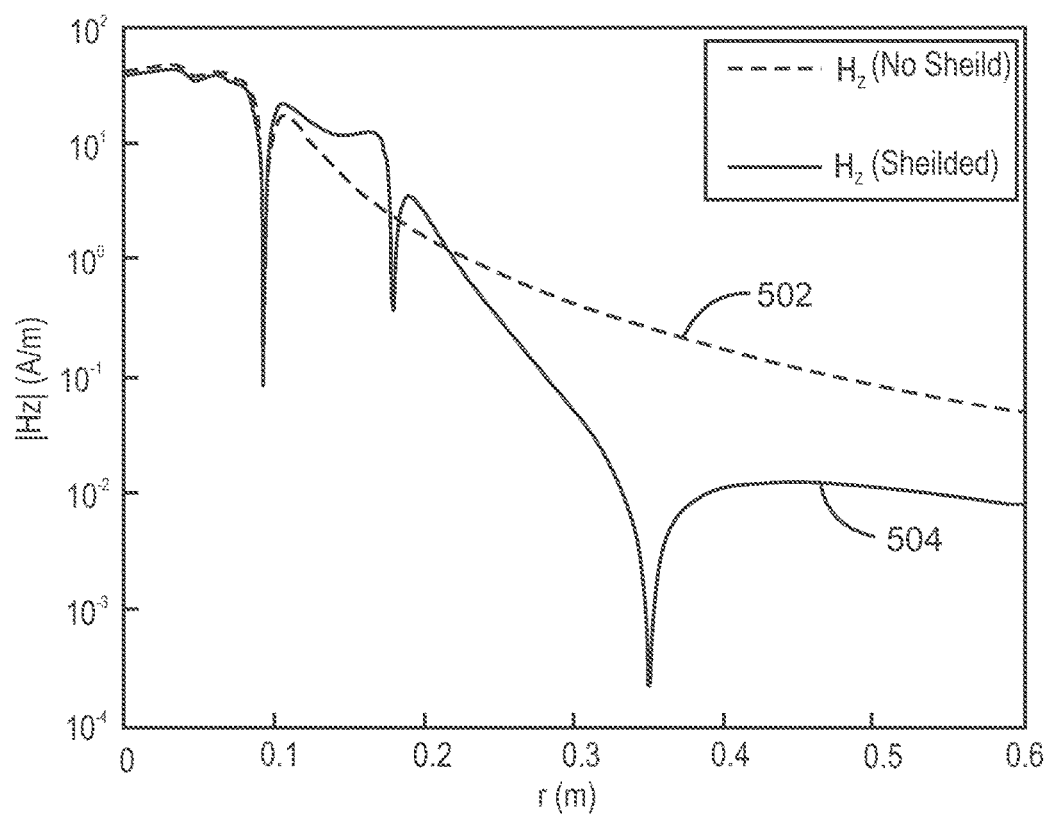
FIG. 5 is a logarithmic graph of the magnetic field components of a shielded transmit coil.

FIG. 5 is a logarithmic graph of the magnetic field components of a shielded transmit coil. The graph of FIG. 5 represents calculated field values for a circular-shaped shielded transmit coil, wherein the radius of the shielding coil is approximately $1.78*r_0$ meters (m). The calculations were performed for a frequency of approximately 6.78

Megahertz (MHz), which is the frequency of A4WP standard. The distance $r_0$ represents the radius of the outer most turn of the primary turns of the transmit coil.

Also shown in FIG. 5 are two field profiles, one for a transmit coil with shielding and one for a transmit coil with no shielding. The field profiles are to replicate the expected field measurement that would be acquired at a distance of 11 millimeters (mm) above the plane of the transmit coil. The dashed line 502 represents the field profile for a transmit coil with no shielding. The solid line 504 represents the field profile for the transmit coil with shielding.

As can be seen in the graph 500, the shielding turn is able to provide significant cancellation of the magnetic field after a distance of about 0.2 meters away from the center of the transmit coil. Thus, if another transmit coil were to be placed in the field cancellation region, coupling between two transmit coils would be small. Additionally, the cancellation to the magnetic field in the active charging area is small, less than 10 percent. Experimental measurements have demonstrated similar results.

EXAMPLES

Example 1 is a power transmitting unit. The power transmitting unit includes a transmitter coil configured to generate a magnetic field to wirelessly power a device within an active wireless charging area; a power generating circuitry to deliver current to the transmitter coil to generate the magnetic field; and a shield disposed around the transmitter coil to reduce a strength of the magnetic field outside of the active wireless charging area during operation of the power transmitting unit.

Example 2 includes the power transmitting unit of example 1, including or excluding optional features. In this example, the shield includes a driven shielding turn. Optionally, the driven shielding turn is conductively coupled to the transmitter coil.

Example 3 includes the power transmitting unit of any one of examples 1 to 2, including or excluding optional features. In this example, the shield includes a passive shielding turn that is parasitically excited by the magnetic field generated by the transmitter coil.

Example 4 includes the power transmitting unit of any one of examples 1 to 3, including or excluding optional features. In this example, the shield includes a conductive ring that concentrically surrounds the transmitter coil.

Example 5 includes the power transmitting unit of any one of examples 1 to 4, including or excluding optional features. In this example, the shield includes a plurality of capacitors that separate the shield into a plurality of resonant segments.

Example 6 includes the power transmitting unit of any one of examples 1 to 5, including or excluding optional features. In this example, a gap between the shield and the transmitter coil is approximately 0.7 to 0.8 times a radius of the transmitter coil.

Example 7 includes the power transmitting unit of any one of examples 1 to 6, including or excluding optional features. In this example, the power transmitting unit is built into a table adjacent to an additional power transmitting unit.

Example 8 is a method of manufacturing a power transmitting unit. The method includes forming a transmitter coil configured to generate a magnetic field to wirelessly power a device within an active wireless charging area, wherein forming the transmitter coil includes forming a primary turn; conductively coupling a power generating circuitry to the primary turn, the power generating circuitry to deliver current to the transmitter coil to generate the magnetic field; and disposing a shielding turn around the transmitter coil to reduce a strength of the magnetic field outside of the active wireless charging area during operation of the power transmitting unit.

Example 9 includes the method of example 8, including or excluding optional features. In this example, the method includes conductively coupling the shielding turn to the power generating circuitry. Optionally, the method includes conductively coupling the shielding turn to the transmitter coil.

Example 10 includes the method of any one of examples 8 to 9, including or excluding optional features. In this example, the method includes conductively isolating the shielding turn from the transmitter coil.

Example 11 includes the method of any one of examples 8 to 10, including or excluding optional features. In this example, forming the shielding turn includes forming a conductive ring that concentrically surrounds the transmitter coil.

Example 12 includes the method of any one of examples 8 to 11, including or excluding optional features. In this example, the method includes separating the shielding turn into a plurality of resonant segments and coupling each the plurality of resonant segments through a capacitor.

Example 13 includes the method of any one of examples 8 to 12, including or excluding optional features. In this example, disposing a shielding turn around the transmitter coil includes forming a gap between the shielding turn and the primary turn of approximately 0.7 to 0.8 times a radius of the primary turn.

Example 14 includes the method of any one of examples 8 to 13, including or excluding optional features. In this example, the method includes disposing the power transmitting unit into a table adjacent to an additional power transmitting unit.

Example 15 is a wireless charger. The wireless charger includes a transmitter coil configured to generate a magnetic field to wirelessly power a device within an active wireless charging area, wherein the transmitter coil includes an outer primary turn and at least an inner primary turn; a power generating circuitry to deliver current to the transmitter coil to generate the magnetic field; and a shielding turn disposed around the transmitter coil to reduce a strength of the magnetic field outside of the active wireless charging area during operation of the wireless charger.

Example 16 includes the wireless charger of example 15, including or excluding optional features. In this example, the shielding turn is conductively coupled to the power generating circuitry. Optionally, the shielding turn is conductively coupled to the transmitter coil.

Example 17 includes the wireless charger of any one of examples 15 to 16, including or excluding optional features. In this example, the shielding turn is conductively isolated from the transmitter coil and is parasitically excited by the magnetic field generated by the transmitter coil.

Example 18 includes the wireless charger of any one of examples 15 to 17, including or excluding optional features. In this example, the shielding turn includes a conductive ring that concentrically surrounds the transmitter coil.

Example 19 includes the wireless charger of any one of examples 15 to 18, including or excluding optional features. In this example, the shielding turn includes a plurality of capacitors that separate the shielding turn into a plurality of resonant segments.

Example 20 includes the wireless charger of any one of examples 15 to 19, including or excluding optional features.

In this example, a gap between the shielding turn and the transmitter coil is approximately 0.7 to 0.8 times a radius of the transmitter coil.

Example 21 includes the wireless charger of any one of examples 15 to 20, including or excluding optional features. In this example, the wireless charger is built into a table adjacent to an additional power transmitting unit.

Example 22 is an apparatus for wirelessly powering a device. The apparatus includes means for generating a magnetic field to wirelessly power a device within an active wireless charging area; means for delivering current to the means for generating the magnetic field; and means for reducing a strength of the magnetic field outside of the active wireless charging area during operation of the apparatus.

Example 23 includes the apparatus of example 22, including or excluding optional features. In this example, the means for reducing the strength of the magnetic field outside of the active wireless charging area includes a conductive shielding turn disposed around the means for generating the magnetic field. Optionally, the shielding turn is conductively coupled to the means for delivering current.

Example 24 includes the apparatus of any one of examples 22 to 23, including or excluding optional features. In this example, the means for reducing the strength of the magnetic field outside of the active wireless charging area includes a passive shielding turn that is parasitically excited by the means for generating the magnetic field.

Example 25 includes the apparatus of any one of examples 22 to 24, including or excluding optional features. In this example, the means for reducing the strength of the magnetic field outside of the active wireless charging area includes a conductive ring that concentrically surrounds the means for generating the magnetic field. Optionally, the means for reducing the strength of the magnetic field outside of the active wireless charging area includes a plurality of capacitors that separate the conductive ring into a plurality of resonant segments.

Example 26 includes the apparatus of any one of examples 22 to 25, including or excluding optional features. In this example, the means for generating the magnetic field includes a conductive coil and the means for reducing the strength of the magnetic field outside of the active wireless charging area includes a conductive ring that concentrically surrounds the conductive coil. Optionally, a gap between the conductive ring and the conductive coil is approximately 0.7 to 0.8 times a radius of the conductive coil. Optionally, the apparatus is built into a table adjacent to an additional apparatus for wirelessly powering a device.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A power transmitting unit, comprising:
 a transmitter coil configured to generate a magnetic field to wirelessly power a device within an active wireless charging area;
 a power generating circuitry to deliver current to the transmitter coil to generate the magnetic field; and
 a shield disposed around the transmitter coil to reduce a strength of the magnetic field outside of the active wireless charging area during operation of the power transmitting unit, wherein the shield comprises a plurality of capacitors that separate the shield into a plurality of resonant segments.

2. The power transmitting unit of claim 1, wherein the shield comprises a driven shielding turn.

3. The power transmitting unit of claim 2, wherein the driven shielding turn is conductively coupled to the transmitter coil.

4. The power transmitting unit of claim 1, wherein the shield comprises a passive shielding turn that is parasitically excited by the magnetic field generated by the transmitter coil.

5. The power transmitting unit of claim 1, wherein the shield comprises a conductive ring that concentrically surrounds the transmitter coil.

6. The power transmitting unit of claim 1, wherein a gap between the shield and the transmitter coil is 0.7 to 0.8 times a radius of the transmitter coil.

7. The power transmitting unit of claim 1, wherein the power transmitting unit is built into a table adjacent to an additional power transmitting unit.

8. A method of manufacturing a power transmitting unit, comprising:
   forming a transmitter coil configured to generate a magnetic field to wirelesly power a device within an active wireless charging area, wherein forming the transmitter coil comprises forming a primary turn;
   conductively coupling a power generating circuitry to the primary turn, the power generating circuitry to deliver current to the transmitter coil to generate the magnetic field; and
   disposing a shielding turn around the transmitter coil to reduce a strength of the magnetic field outside of the active wireless charging area during operation of the power transmitting unit, wherein the shielding turn comprises a plurality of resonant segments coupled to one another through a capacitor.

9. The method of claim 8, comprising conductively coupling the shielding turn to the power generating circuitry.

10. The method of claim 9, comprising conductively coupling the shielding turn to the transmitter coil.

11. The method of claim 8, comprising conductively isolating the shielding turn from the transmitter coil.

12. The method of claim 8, wherein forming the shielding turn comprises forming a conductive ring that concentrically surrounds the transmitter coil.

13. The method of claim 8, wherein disposing a shielding turn around the transmitter coil comprises forming a gap between the shielding turn and the primary turn of 0.7 to 0.8 times a radius of the primary turn.

14. The method of claim 8, comprising disposing the power transmitting unit into a table adjacent to an additional power transmitting unit.

15. A wireless charger, comprising:
   a transmitter coil configured to generate a magnetic field to wirelessly power a device within an active wireless charging area, the transmitter coil comprising an outer primary turn and at least an inner primary turn;
   a power generating circuitry to deliver current to the transmitter coil to generate the magnetic field; and
   a shielding turn disposed around the transmitter coil to reduce a strength of the magnetic field outside of the active wireless charging area during operation of the wireless charger, wherein the shielding turn comprises a plurality of resonant segments coupled to one another through a capacitor.

16. The wireless charger of claim 15, wherein the shielding turn is conductively coupled to the power generating circuitry.

17. The wireless charger of claim 16, wherein the shielding turn is conductively coupled to the transmitter coil.

18. The wireless charger of claim 15, wherein the shielding turn is conductively isolated from the transmitter coil and is parasitically excited by the magnetic field generated by the transmitter coil.

19. The wireless charger of claim 15, wherein the shielding turn comprises a conductive ring that concentrically surrounds the transmitter coil.

20. The wireless charger of claim 15, wherein a gap between the shielding turn and the transmitter coil is approximately 0.7 to 0.8 times a radius of the transmitter coil.

21. The wireless charger of claim 15, wherein the wireless charger is built into a table adjacent to an additional wireless charger.

* * * * *